United States Patent
Chincholi et al.

(10) Patent No.: US 10,225,785 B2
(45) Date of Patent: Mar. 5, 2019

(54) WIRELESS DEVICE INITIATED HANDOVER

(71) Applicant: QUALCOMM Incorporated, San Diego, CA (US)

(72) Inventors: Amith Vikram Chincholi, Sunnyvale, CA (US); Valentin Alexandru Gheorghiu, Tokyo (JP); Masato Kitazoe, Hachiouji (JP); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/486,158

(22) Filed: Apr. 12, 2017

(65) Prior Publication Data

US 2017/0359765 A1 Dec. 14, 2017

Related U.S. Application Data

(60) Provisional application No. 62/347,547, filed on Jun. 8, 2016.

(51) Int. Cl.
*H04W 36/36* (2009.01)
*H04L 5/00* (2006.01)
(Continued)

(52) U.S. Cl.
CPC .......... *H04W 36/36* (2013.01); *H04L 5/0048* (2013.01); *H04L 5/0057* (2013.01); *H04L 43/16* (2013.01); *H04W 24/10* (2013.01); *H04W 36/0088* (2013.01); *H04W 36/08* (2013.01); *H04W 36/30* (2013.01); *H04W 56/001* (2013.01); *H04W 76/19* (2018.02); *H04W 76/27* (2018.02);
(Continued)

(58) Field of Classification Search
None
See application file for complete search history.

(56) References Cited

U.S. PATENT DOCUMENTS 6,018,661 A * 1/2000 Raith ................ H04W 36/0088
455/434
2010/0124172 A1 5/2010 Tenny et al.
(Continued)

OTHER PUBLICATIONS

International Search Report and Written Opinion—PCT/US2017/027363—ISA/EPO—dated Jun. 21, 2017.

*Primary Examiner* — Mazda Sabouri
(74) *Attorney, Agent, or Firm* — Patterson & Sheridan, LLP (57) ABSTRACT

Aspects of the present disclosure provide techniques and apparatus for user equipment initiated handover. Certain aspects include a method for wireless communications by a user equipment (UE) including determining a first signal metric between the UE and a first base station, while the UE has a connection established with the first base station. The method further includes determining a second signal metric between the UE and a second base station, while the UE does not have a connection established with the second base station. The method further includes determining that the second signal metric is stronger than the first signal metric. The method further includes declaring a radio link failure with the first base station based on determining that the second signal metric is stronger than the first signal metric. The method further includes establishing a connection with the second base station.

36 Claims, 6 Drawing Sheets

(51) Int. Cl.
*H04L 12/26* (2006.01)
*H04W 24/10* (2009.01)
*H04W 36/00* (2009.01)
*H04W 36/08* (2009.01)
*H04W 36/30* (2009.01)
*H04W 56/00* (2009.01)
*H04W 76/19* (2018.01)
*H04W 76/27* (2018.01)
*H04W 76/28* (2018.01)
*H04W 88/02* (2009.01)
*H04W 88/08* (2009.01)

(52) U.S. Cl.
CPC .......... *H04W 76/28* (2018.02); *H04W 36/305* (2018.08); *H04W 88/02* (2013.01); *H04W 88/08* (2013.01)

(56) References Cited

U.S. PATENT DOCUMENTS

2012/0164948 A1* 6/2012 Narasimha ........ H04W 72/1215
455/63.1
2015/0358864 A1 12/2015 Park et al.

\* cited by examiner

WIRELESS DEVICE INITIATED HANDOVER

CROSS-REFERENCE TO RELATED APPLICATIONS

This application claims the benefit of U.S. Provisional Patent No. 62/347,547, filed Jun. 8, 2016. The content of the provisional application is hereby incorporated by reference in its entirety.

FIELD OF THE DISCLOSURE

Certain aspects of the present disclosure generally relate to wireless communications and, more particularly, to wireless device initiated handover.

DESCRIPTION OF RELATED ART

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

Since terminals may be mobile, the terminals may move between coverage areas of different base stations. Accordingly, the wireless multiple-access communication system may support performing a handover of the connection used by the terminal to communicate in the wireless communication system from a source base station to a target base station so that the terminal does not experience a drop in connectivity as it moves between coverage areas.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to wireless device initiated handover.

Certain aspects of the present disclosure provide a method, performed by a wireless device, such as a user equipment (UE). The method includes determining a first signal metric between the UE and a first base station, while the UE has a connection established with the first base station. The method further includes determining a second signal metric between the UE and a second base station, while the UE does not have a connection established with the second base station. The method further includes determining that the second signal metric is stronger than the first signal metric. The method further includes declaring a radio link failure with the first base station based on determining that the second signal metric is stronger than the first signal metric. The method further includes establishing a connection with the second base station.

Certain aspects of the present disclosure provide a user equipment (UE). The UE includes a memory and a processor. The processor is configured to determine a first signal metric between the UE and a first base station, while the UE has a connection established with the first base station. The processor is further configured to determine a second signal metric between the UE and a second base station, while the UE does not have a connection established with the second base station. The processor is further configured to determine that the second signal metric is stronger than the first signal metric. The processor is further configured to declare a radio link failure with the first base station based on determining that the second signal metric is stronger than the first signal metric. The processor is further configured to establish a connection with the second base station.

Certain aspects of the present disclosure provide a user equipment (UE). The UE includes means for determining a first signal metric between the UE and a first base station, while the UE has a connection established with the first base station. The UE further includes means for determining a second signal metric between the UE and a second base station, while the UE does not have a connection established with the second base station. The UE further includes means for determining that the second signal metric is stronger than the first signal metric. The UE further includes means for declaring a radio link failure with the first base station based on determining that the second signal metric is stronger than the first signal metric. The UE further includes means for establishing a connection with the second base station.

Certain aspects of the present disclosure provide a computer readable medium having instructions stored thereon for performing a method for wireless communications by a user equipment (UE). The method includes determining a first signal metric between the UE and a first base station, while the UE has a connection established with the first base station. The method further includes determining a second signal metric between the UE and a second base station, while the UE does not have a connection established with the second base station. The method further includes determining that the second signal metric is stronger than the first signal metric. The method further includes declaring a radio link failure with the first base station based on determining that the second signal metric is stronger than the first signal metric. The method further includes establishing a connection with the second base station.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for wireless device initiated handover. According to certain aspects, a wireless device, e.g., user equipment, may have an established connection (e.g., radio resource control (RRC) connection) with a first base station (e.g., serving cell). Further, the user equipment may determine a signal metric, e.g., reference signal received power (RSRP), reference signal received quality (RSRQ), etc., of a second base station (e.g., neighboring cell) is stronger/better than a signal metric of the first base station (e.g., satisfies a threshold). Accordingly, the user equipment may itself (e.g., autonomously) declare a radio link failure (RLF) with the first base station based on the second base station having the stronger signal metric (e.g., by at least a threshold), even though there is not actually a radio link failure between the user equipment and the first base station based on channel conditions between the user equipment and the first base station. In particular, when referring to the user equipment declaring a RLF with the first base station (e.g., based on the second base station having the stronger signal metric), it is meant to refer to a situation where the user equipment still may have adequate channel conditions (e.g., one or more signal metrics satisfy a threshold) to communicate with the first base station, but still forces a RLF (e.g., based on the second base station having a strong signal metric). Such a declaration of an RLF may be referred to herein as declaration of an "autonomous RLF". The user equipment may then establish a connection (e.g., initiate a radio resource control (RRC) connection reestablishment procedure) with the second base station. Accordingly, the user equipment may move its connection to the wireless network from the first base station to the second base station, effectively performing a handover.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, wearables (e.g., smart watch, smart bracelet, smart glasses, virtual reality goggles, smart ring, smart clothing), gaming devices, entertainment devices, cameras, music players, medical/healthcare devices, vehicular devices, navigation/positioning devices, etc. Some UEs may be considered machine-type communications (MTC) UEs, which may include remote devices, such as drones, robots/robotic devices, sensors, meters, cameras, monitors, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC UEs, as well as other types of UEs, may include internet of everything (IoE) or internet-of-things (IoT) devices, such as NB-IoT (narrowband internet-of-things) devices.

It is noted that while aspects may be described herein using terminology commonly associated with 3G and/or 4G wireless technologies, aspects of the present disclosure can be applied in other generation-based communication systems, such as 5G and later.

Example Wireless Communications Network

Figure 1:
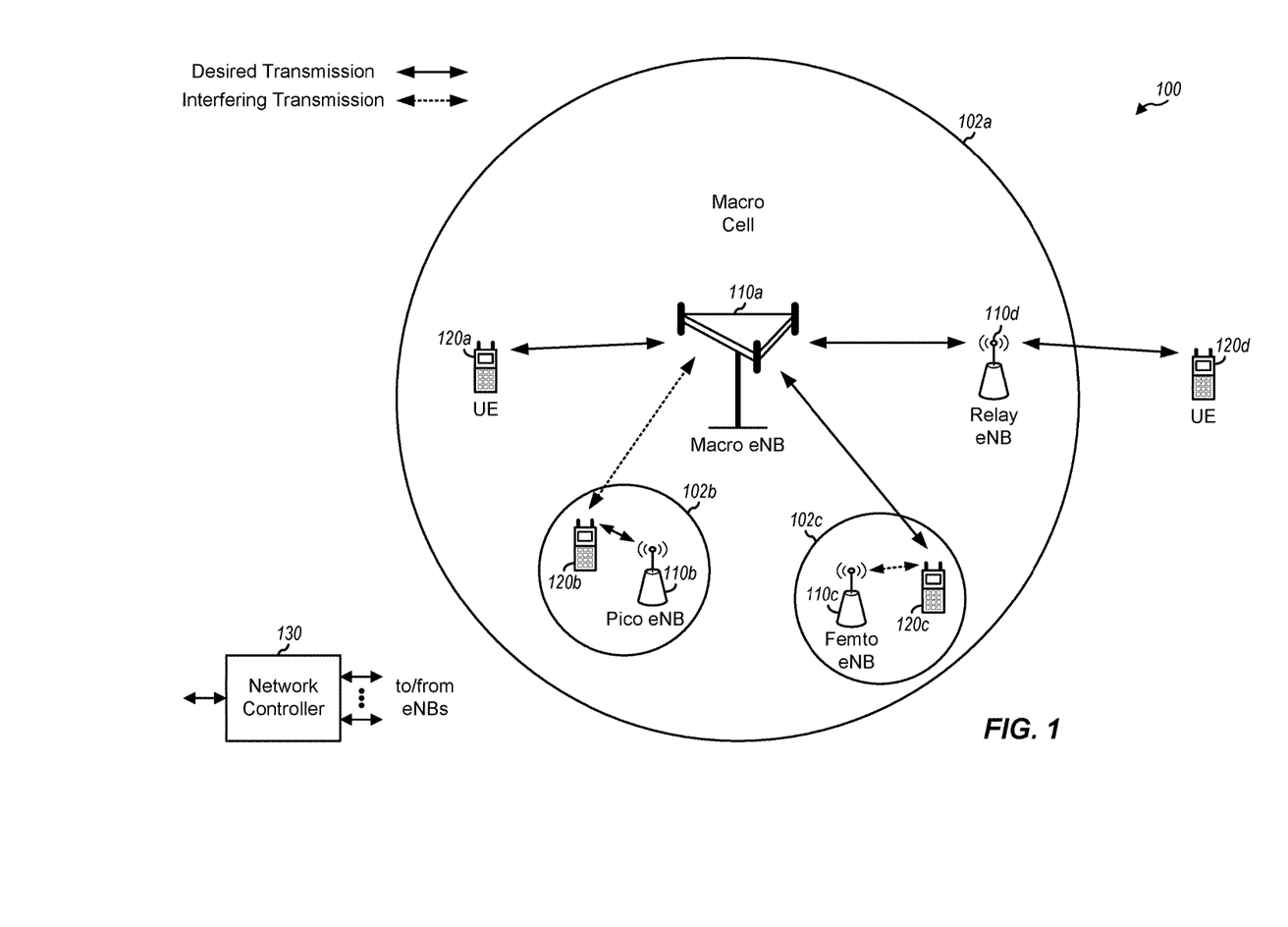
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used for wireless device initiated handover.

In aspects, a user equipment (UE) 120, such as an eMTC device, low cost UE, or NB-IoT device, can determine that the signal metric of another evolved Node B (eNB) 110 is stronger than an eNB 110 that the UE 120 currently has a connection with (e.g., RRC connection). Accordingly the UE 120 may itself initiate a radio link failure (RLF) procedure with the eNB 110 it currently has a connection with, and instead establish a connection with the other eNB 110 that has a stronger signal metric. In particular, the UE 120 may declare an autonomous RLF with the eNB 110 it currently has a connection with, even if it still has adequate channel conditions to communicate with the eNB 110.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In certain aspects, a UE 120 may operate in either a connected mode (e.g., RRC connected mode) or an idle mode (e.g., RRC idle mode). In the RRC connected mode, the UE 120 may be connected to a particular eNB 110. In certain aspects, mobility of the UE 120 in such a connected mode may typically be controlled by the network 100, as opposed to autonomously by the UE 120. Accordingly, the UE 120 may typically perform measurements of signal metrics of neighboring eNBs 110 and provide the measurement report to the serving eNB 110 the UE 120 has a connection with.

In the idle mode, the UE 120 does not have a connection established with an eNB 110. In certain aspects, in the idle mode, the UE 120 may control mobility of the UE 120. The UE 120 may perform measurements of signal metrics of neighboring eNBs 110 and perform selection of one of the neighboring eNBs 110 to establish a connection with.

In certain aspects, the UE 120 may be able to operate in an active state or one or more low power states (e.g., sleep states) and support discontinuous reception (DRX) including connected mode DRX (cDRX), where the UE 120 is in a connected mode. For example, in some aspects, the UE 120 may (e.g., cyclically) switch between one or more designated active periods (where the UE 120 is supposed to be in an active state) and one or more designated sleep periods (wherein the UE 120 is supposed to be in a sleep state) according to DRX cycles, where the UE 120 supports DRX (e.g., cDRX). In DRX mode, the UE may be configured to awake from sleep states after some period of time (e.g., 320 ms). Accordingly, after the UE is in the sleep state for a set sleep period, the UE may awake into an active state for an active period. The duration of any given active period may be based on whether there is data available for the UE to receive or transmit from or to the base station.

Figure 2:
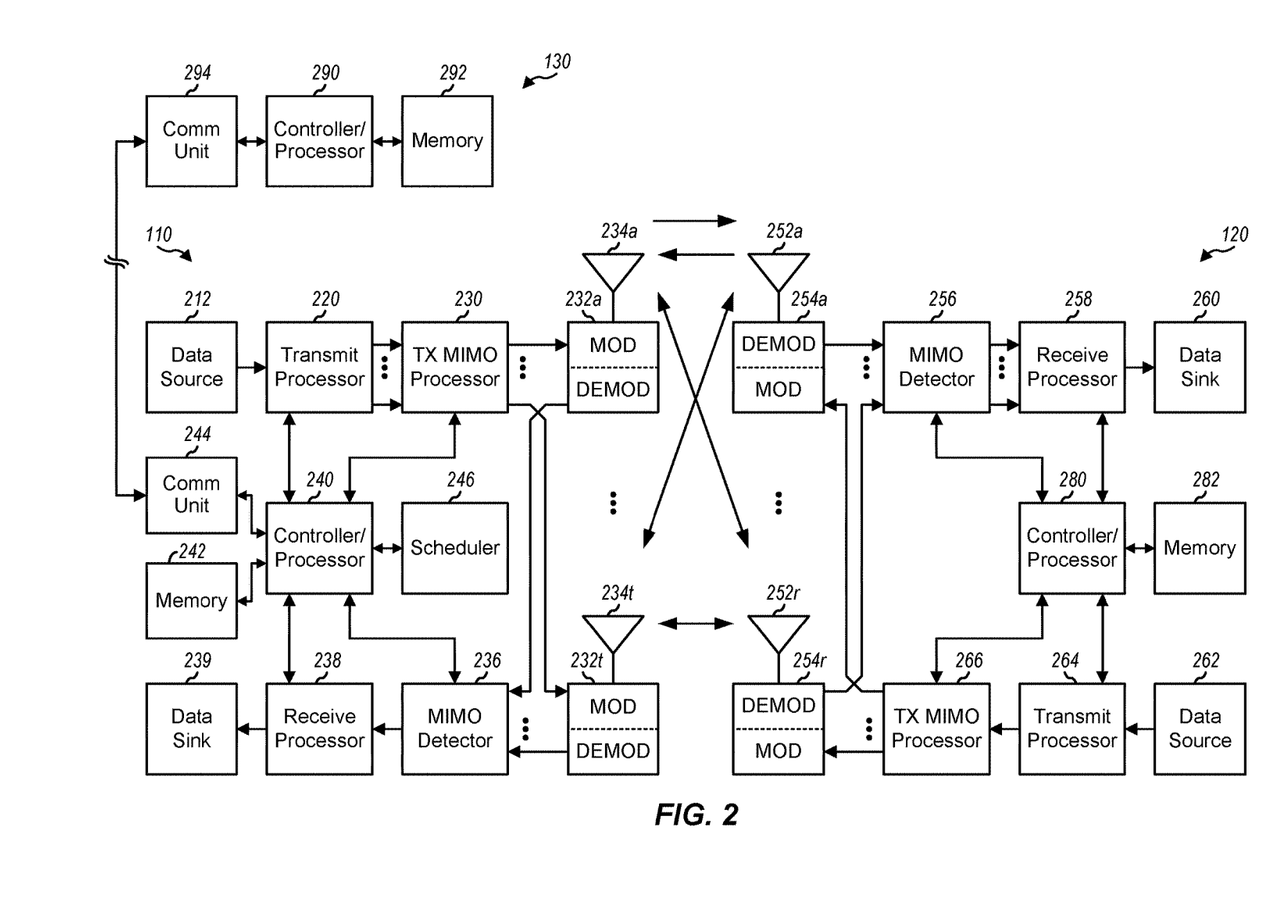
FIG. 2 shows a block diagram conceptually illustrating an example of a base station in communication with a user equipment (UE) in a wireless communications network, in accordance with certain aspects of the present disclosure.

FIG. 2 shows a block diagram of a design eNB 110 and UE 120, which may be one of the eNBs and one of the UEs in FIG. 1. The eNB 110 may be equipped with T antennas 234a through 234t, and UE 120 may be equipped with R antennas 252a through 252r, where in general T 1 and R 1.

At eNB 110, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from eNB 110 and/or other eNBs and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine signal metric(s) (e.g., RSRP, RSSI, RSRQ, CQI, etc.) Further, in certain aspects, the controller/processor 280 may be configured to declare a radio link failure (RLF) and initiate establishing a connection with an eNB 110 based on the determined signal metric(s). In particular, the controller/processor 280 may declare an autonomous RLF with an eNB 110 the UE 120 currently has a connection with, even if the UE 120 still has adequate channel conditions to communicate with the eNB 110.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to eNB 110. At eNB 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. The eNB 110 may include communication unit 244 and communicate with network controller 130 via communication unit 244. Network controller 130 may include communication unit 294, controller/processor 290, and memory 292.

Controllers/processors 240 and 280 may direct the operation at eNB 110 and UE 120, respectively, to perform techniques presented herein. For example, processor 240 and/or other processors and modules at eNB 110, and processor 280 and/or other processors and modules at UE 120, may perform or direct operations of eNB 110 and UE 120, respectively. For example, controller/processor 280 and/or other controllers/processors and modules at UE 120, and/or controller/processor 240 and/or other controllers/processors and modules at eNB 110 may perform or direct operations 600 in FIG. 6. Memories 242 and 282 may store data and program codes for eNB 110 and UE 120, respectively. A scheduler 246 may schedule UEs for data transmission on the downlink and/or uplink.

Figure 3:
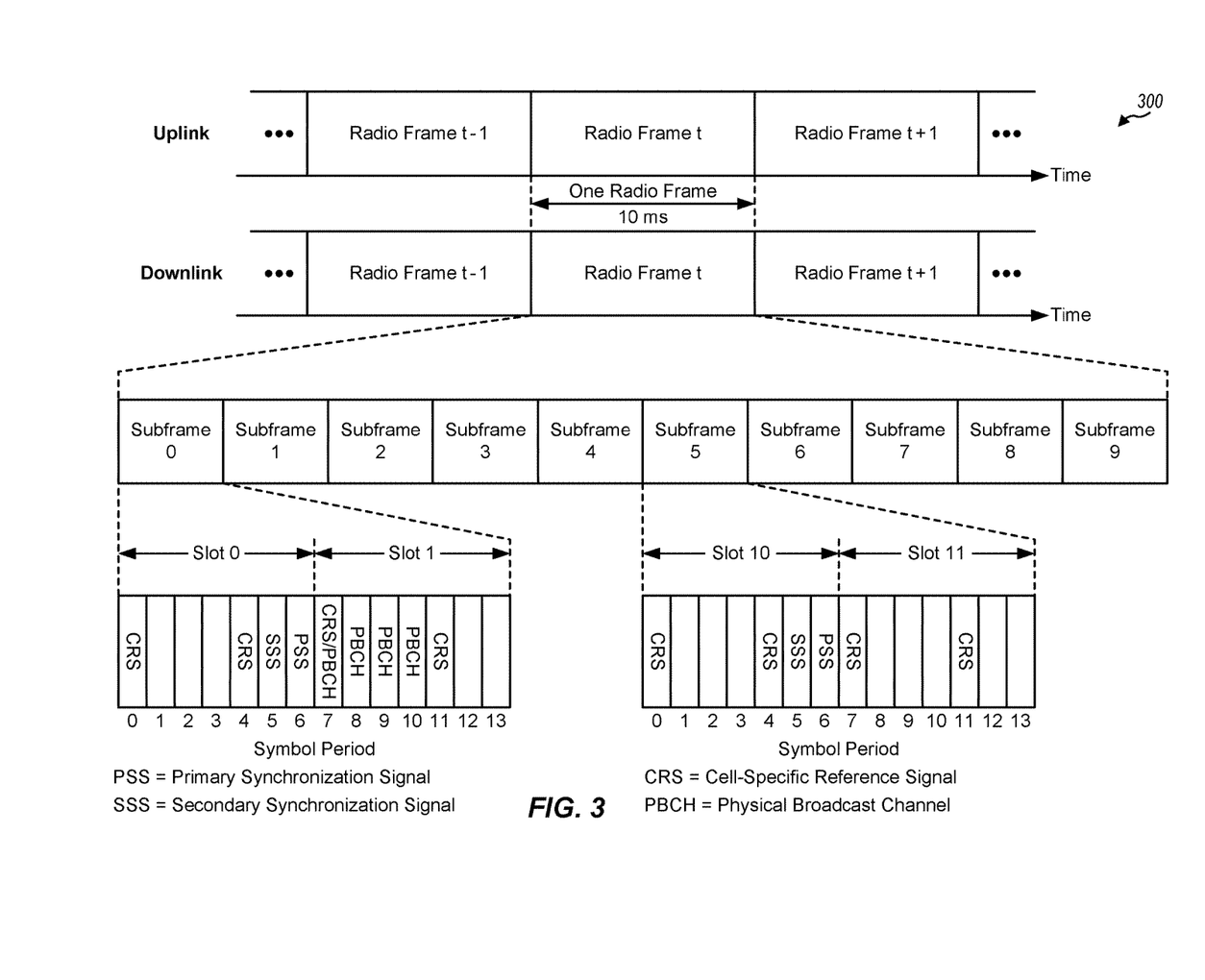
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
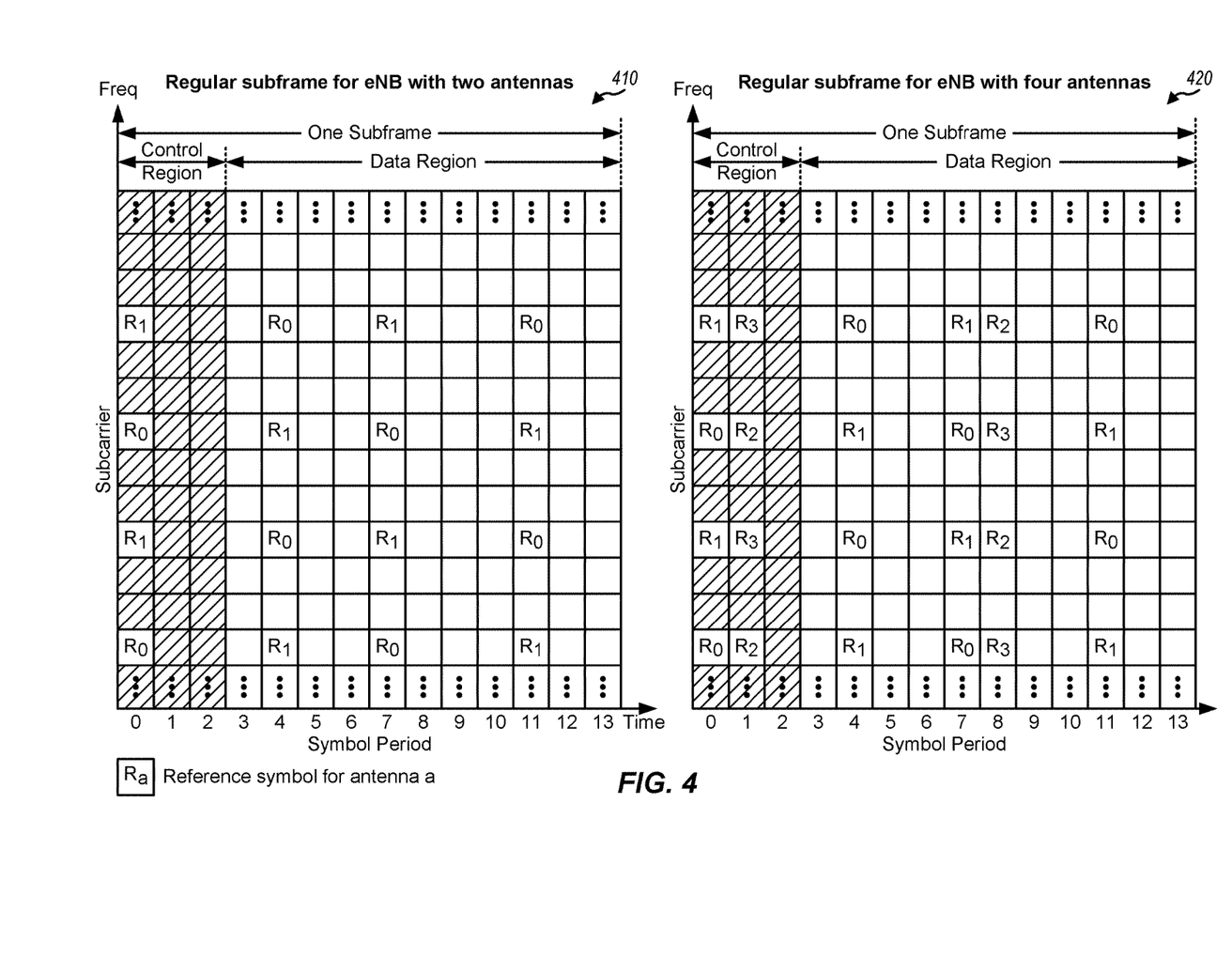
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. In certain aspects, the UE may select the serving eNB based on various criteria such as received signal strength, received signal quality, pathloss, etc. Received signal quality may be quantified by a signal-to-noise-and-interference ratio (SINR), or a reference signal received quality (RSRQ), or a RSRP, or some other metric. The UE may operate in a dominant interference scenario in which the UE may observe high interference from one or more interfering eNBs.

Example Narrowband Communications

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 μs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., enhanced PDCCH or ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB.

Figure 5:
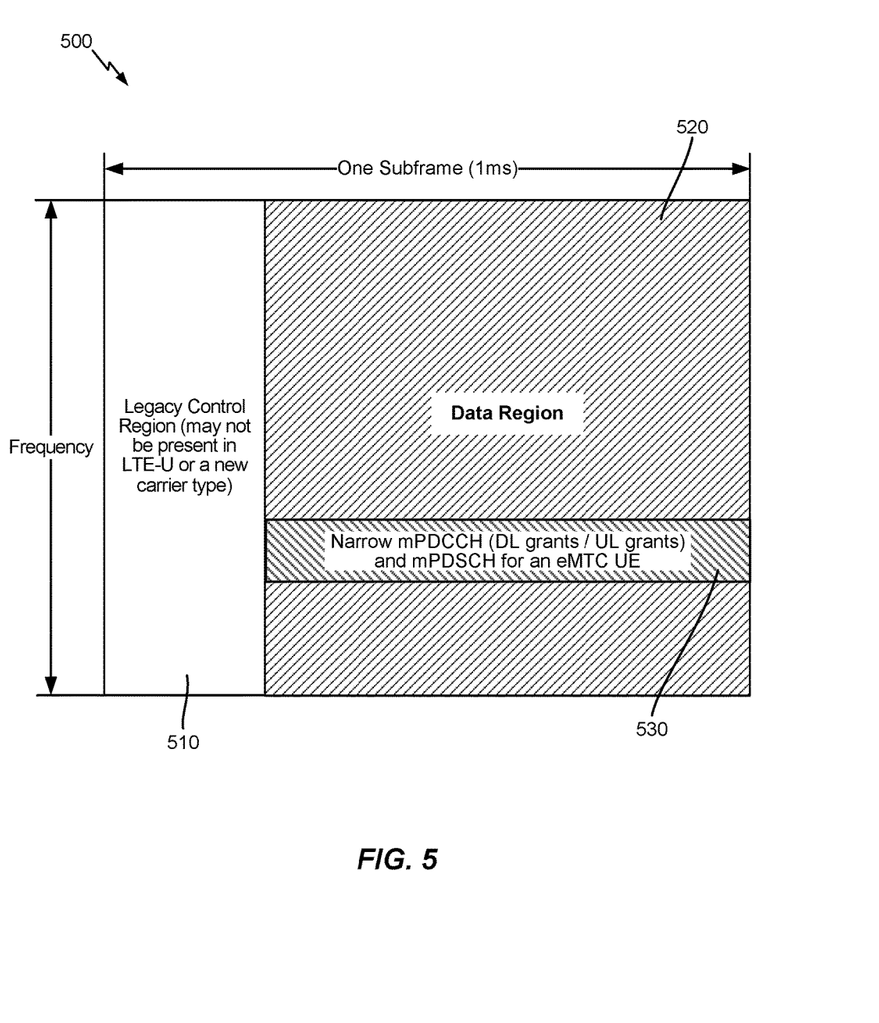
FIG. 5 illustrates an exemplary subframe configuration for narrowband communications, in accordance with certain aspects of the present disclosure.

As illustrated in the subframe structure 500 of FIG. 5, eMTC UEs can support narrowband operation while operating in a wider system bandwidth (e.g., 1.4/3/5/10/15/20 MHz). In the example illustrated in FIG. 5, a conventional legacy control region 510 may span system bandwidth of a first few symbols, while a narrowband region 530 of the system bandwidth (spanning a narrow portion of a data region 520) may be reserved for an MTC physical downlink control channel (referred to herein as an M-PDCCH) and for an MTC physical downlink shared channel (referred to herein as an M-PDSCH). In some cases, an MTC UE monitoring the narrowband region may operate at 1.4 MHz or 6 resource blocks (RBs).

However, as noted above, eMTC UEs may be able to operate in a cell with a bandwidth larger than 6 RBs. Within this larger bandwidth, each eMTC UE may still operate (e.g., monitor/receive/transmit) while abiding by a 6-physical resource block (PRB) constraint. In some cases, different eMTC UEs may be served by different narrowband regions (e.g., with each spanning 6-PRB blocks). As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

The wireless communication network may support a 180 kHz deployment for narrowband operation (or narrowband internet-of-things (NB-IoT)) with different deployment modes. In one example, narrowband operations may be deployed in-band, for example, using resource blocks within a wider system bandwidth. In one case, narrowband operations may use one resource block within the wider system bandwidth of an LTE network. In this case, the 180 kHz bandwidth for the resource block may have to be aligned with a wideband LTE resource block. In one example, narrowband operations may be deployed in the unused resource blocks within a LTE carrier guard-band. In this deployment, the 180 kHz RB within the guard band may have to be aligned with a 15 kHz tone grid of wideband LTE, for example, in order to use the same FFT and/or reduce interference in-band legacy LTE communications.

Example Wireless Device Initiated Handover

According to certain aspects, a UE (e.g., eMTC UE, NB-IoT UE, etc.) (e.g., UE 120) may be configured to autonomously initiate handover from a first eNB (e.g., eNB 110) to a second eNB (e.g., eNB 110). For example, in certain aspects, the UE may have an established connection (e.g., radio resource control (RRC) connection) with the first eNB (e.g., serving cell/eNB). Further, the UE may determine one or more signal metrics (e.g., reference signal received power (RSRP) (e.g., narrowband RSRP (NRSRP), RSRQ, signal-to-noise ratio (SNR), CQI, narrowband secondary synchronization channel signal reference power (NSCH_RP), narrowband secondary synchronization channel signal to noise ratio (NSSS-SNR), reference signal signal to interference plus noise ratio (RS-SINR), etc.), of the second eNB (e.g., neighboring cell/eNB) is stronger than one or more signal metrics of the first eNB (e.g., by a threshold amount). In certain aspects, RS-SINR can be computed as follows, wherein (linear) refers to a linear function to calculate the given variable:

$$RS\_SINR(\text{linear}) = \frac{RSRP(\text{linear})}{\left\{ \frac{RSSI(\text{linear})}{12} - RSRP(\text{linear}) \right\}}$$

In certain aspects, the UE (e.g., firmware in the UE) computes the above metrics like received signal strength indicator (RSSI), RSRP, etc. In certain aspects, the UE (e.g., a software-based downlink search module executed by one or more processors of the UE) may store the metrics. Further, in certain aspects, the UE (e.g., a software-based uplink module executed by one or more processors of the UE that queries the downlink search module for one of the metrics (e.g., RS-SINR)) based on the metric, may map the metric to a corresponding block error ratio (BLER), such as based on a look-up table stored in the UE. In certain aspects, if BLER>10%, RLF is triggered by the UE. Accordingly, the UE may itself (e.g., autonomously) declare a radio link failure (RLF) with the first eNB based on the second eNB having the stronger signal metric(s) (e.g., by at least a threshold), even though there is not actually a radio link failure between the UE and the first eNB. In particular, the UE may declare an autonomous RLF with the first eNB, even if it still has adequate channel conditions to communicate with the first eNB. In certain aspects, the UE may only determine the second signal metric of a neighboring eNB if the first signal metric of the serving eNB is below a threshold value. Further, in certain aspects, the UE may only determine if the second signal metric is stronger than the first signal metric if the first signal metric is below the threshold value, and only declare an autonomous RLF if the first signal metric is below the threshold value. The UE may then establish a connection (e.g., initiate a radio resource control (RRC) connection reestablishment procedure) with the second eNB. Accordingly, the UE may move its connection to the wireless network from the first eNB to the second eNB, effectively performing a handover.

In certain aspects, a UE (e.g., eMTC UE, NB-IoT UE, etc.) (e.g., UE 120) may be able to operate even with a very poor signal quality (e.g., low signal-to-noise ratio (SNR) or other signal metrics) between the UE and an eNB (e.g., eNB 110). In particular, in order for the UE 120 and the eNB 110 to transfer data between each other on the uplink (UL) and downlink (DL), the transmitting device (e.g., one of the UE 120 and eNB 110) may transmit data multiple times as multiple instances, and the receiving device (e.g., the other of the UE 120 and eNB 110) may receive the multiple instances of the data and combine the instances in order to properly receive the data. The lower the signal metric between the UE 120 and the eNB 110, the greater the number of times the data may need to be transmitted and received and combined to accurately transfer the data. Such repeated transmissions to transfer data may take a long period of time/cause a large amount of delay for transfer of data between the UE 120 and the eNB 110. Further, the UE 120, as mentioned herein, may operate in a half-duplex mode, which may further extend/delay the time required for data transfer for each repeated transmission.

Accordingly, in certain aspects, it may be beneficial to handover communication with the UE 120 from an eNB 110 (e.g., referred to as eNB 110₁) with a lower signal metric to an eNB 110 (e.g., referred to as eNB 110₂) with a higher signal metric. For example, data transfer between the UE 120 and the eNB 110₂ with the higher signal metric may require fewer repeated transmissions and thus less delay for transfer of data between the UE 120 and the eNB 110₂ with the higher signal metric. However, such handover of the UE 120 may also take time/cause delay. Accordingly, in certain aspects, it may be beneficial to handover communication with the UE 120 in circumstances where the delay from performing handover is less than the delay caused from repeated transmissions for a data transfer with the eNB 110₁ with the lower signal metric as compared to a data transfer with the eNB 110₂ with the higher signal metric (e.g., the delay from repeated transmissions with the eNB 110₁ with the lower signal metric minus the delay from repeated transmissions with the eNB 110₂ with the higher signal metric).

In certain aspects, the handover delay may be compared to the delay of only a single data transfer with the eNB 110₁ with the lower signal metric as compared to a single data transfer with the eNB 110₂ with the higher signal metric. In certain aspects, the handover delay may be compared to the delay of multiple potential data transfers with the eNB 110₁ with the lower signal metric as compared to multiple potential data with the eNB 110₂ with the higher signal metric. For example, the UE 120 may have information regarding a mobility (e.g., movement, location, etc.) of the UE 120, and determine that it is likely that future potential data transfers will also benefit from a connection with a neighboring eNB 110₂ as opposed to a current serving eNB 110₁. Accordingly, if the aggregate delay from multiple potential data transfers with the eNB 110₁ with the lower signal metric as compared to multiple potential data transfers with the eNB 110₂ with the higher signal metric is greater than the handover delay, a handover of the UE 120 may be performed. In certain aspects, the delay of one or more data transfer(s) with a first eNB and a second eNB may be based on other factors, such as the first eNB only supporting half-duplex mode, while the second eNB supports full-duplex mode communications. Accordingly, in certain aspects, the delay calculations may additionally or alternatively be based on such factors, similar to the discussion of delay calculations with respect to signal metrics herein.

In certain aspects, a UE 120 (e.g., eMTC UE, NB-IoT UE, etc.) may not support network initiated handover, or the overhead (e.g., time delay) for receiving signals to determine signal metrics by the UE 120, reporting signal metrics to the network (e.g., via the eNB 110₁) by the UE 120, initiating handover signaling, etc., may be very long, making network initiated handover less desirable. For example, the aforementioned repeated transmissions and/or operation in half-duplex mode may make the network initiated handover delay very long, which may result in a radio link failure (RLF) where the signal between the UE 120 and the eNB 110₁ is lost.

Accordingly, in certain aspects, the UE 120 may itself be configured to initiate a handover procedure. In particular, the UE 120 may initiate a handover procedure by declaring a radio link failure (RLF) with the eNB 110₁ it has a connection with (e.g., RRC connection), even though the signal between the UE 120 and the eNB 110₁ may not be lost and there may not be an actual RLF. In particular, the UE 120 may declare an autonomous RLF with the eNB 110₁ it has a connection with, even if it still has adequate channel conditions to communicate with the eNB 110₁. Further, the UE 120 may perform a connection establishment procedure (e.g., RRC reestablishment) with the neighboring eNB 110₂ it is handing over to. The handover delay for performing such a handover may therefore be based on the delay required to perform the connection establishment procedure. For example, in certain aspects, the UE 120 may be capable of sending a connection reestablishment request (e.g., RRC-ConnectionReestablishmentRequest) message within a certain delay period for the UE 120 to establish a connection (e.g., RRC connection) with an eNB. The delay period may be referred to as a RRC procedure delay and be based on the time required for the UE 120 to acquire and process an uplink grant from the target eNB 110₂ for establishing a connection with, the time required for performing a random access procedure on (e.g., on a physical random access channel (PRACH)), the time required to receive relevant system information, the time to search for a target eNB, the number of frequencies to be monitored, etc. Therefore, the handover delay for the UE 120 initiating a handover procedure as discussed herein may be approximately calculated as the sum of these times.

Accordingly, in certain aspects, if the handover delay for the UE 120 itself initiating and performing a handover procedure from a first eNB 110₁ to a second eNB 110₂, as discussed herein, is less than the delay for repeated transmissions for data transfer(s) at the first eNB 110₁ as compared to the second eNB 110₂, the UE 120 may initiate and perform a handover procedure as discussed herein.

In certain aspects, as discussed above, the number of repeated transmissions between the UE 120 and an eNB may be based on a signal metric (and/or other factors such as support of half-duplex vs. full duplex mode) between the UE 120 and the eNB. Accordingly, the amount of the delay caused from repeated transmissions for a given eNB may be based on or approximately indicated by the signal metric between the UE 120 and the given eNB. Therefore, the signal metric of a signal between the UE 120 and the eNB may be used to approximate the amount of delay caused from repeated transmissions between the UE 120 and the eNB. Thus, the amount of delay from repeated transmissions between the UE 120 and a first eNB 110₁ with a first signal metric, and the amount of delay from repeated transmissions between the UE 120 and a second eNB 110₂ with a second signal metric may be approximated by the first signal metric and the second signal metric, respectively. The difference between the amount of delay for data transfer for the first eNB 110₁ and the second eNB 110₂ may therefore be approximated by the difference between the first signal metric and the second signal metric.

As discussed herein, if the difference between the amount of delay for data transfer for the first eNB 110₁ and the second eNB 110₂ is greater than the expected handover delay, then the UE 120 may initiate a handover to the eNB 110₂ with the stronger signal metric. Therefore, the handover delay may act as a threshold or be used to calculate a threshold (e.g., threshold signal metric difference), as to whether the UE 120 initiates a handover from a first eNB 110₁ to a second eNB 110₂. Based on the above, the difference between the amount of delay for data transfer for the first eNB 110₁ and the second eNB 110₂ may be approximated by the difference between the first signal metric and the second signal metric. Therefore, in certain aspects, if the difference between the first signal metric and the second signal metric satisfies a threshold (e.g., based on the handover delay) the UE 120 initiates and perform a handover from the first eNB 110₁ to the second eNB 110₂.

In certain aspects, the UE 120 may determine the signal metrics used to determine whether to initiate and perform a handover procedure, based on signals received/measured from each eNB. For example, the UE 120 may receive/measure signals received from an eNB (e.g., serving eNB) that the UE 120 has an established connection (e.g., RRC connection) with, as well as receive/measure signals from one or more other eNBs (e.g., neighboring eNBs) that the UE 120 does not have a connection with, but is within the coverage area of. The UE 120 may then determine the signal metrics for each of the eNBs based on the received/measured signals and determine whether to initiate and perform a handover to one of the neighboring eNBs as discussed herein. For example, the UE 120 may handover to the one of the neighboring eNBs with the strongest signal metric, so long as the difference between the signal metric of the neighboring eNB and the serving eNB satisfies a threshold.

In certain aspects, the UE 120 may be configured to receive/measure signals from eNBs, determine signal metrics, and/or determine whether to initiate and perform a handover procedure aperiodically (e.g., when the UE 120 has data to transmit/receive) and/or periodically (e.g., at fixed time intervals).

In certain aspects, the UE 120 may be able to receive/measure signals on the frequency or frequencies used for communication (e.g., intrafrequency communication) with the serving eNB at any time. However, in certain aspects, the UE 120 may only be able to receive/measure signals on frequencies not used for communication (e.g., interfrequency communication) with the serving eNB at designated time periods. In particular, some of the neighboring eNBs may utilize different frequencies for communication than the serving eNB, and therefore the UE 120 may need to suspend communication with the serving eNB and receive/measure signals on the different frequencies during the designated time periods.

Accordingly, in certain aspects, a UE 120 may be configured to receive/measure the signals from each eNB at designated measurement gaps/intervals. In certain aspects, the UE 120 may be configured to receive/measure the signals from each eNB at each such designated measurement gap/interval. In certain aspects, the UE 120 may be configured to only receive/measure the signals from each eNB at designated measurement gaps/intervals when the UE 120 has data to receive from or transmit to an eNB. Accordingly, in certain aspects, the UE may determine whether to initiate and perform a handover procedure at such designated measurement gaps/intervals where the UE 120 receives/measures signals from each eNB. The UE 120 may then receive/transmit the data.

In certain aspects, the UE 120 may support cDRX, as discussed herein, and be configured to receive/measure signals from each eNB during a sleep period prior (e.g., by a fixed time period) to an active period. For example, in certain aspects, if a UE 120 has data to receive from or transmit to an eNB while in a sleep state, the UE 120 may enter an active state prior to a designated active period for receiving/transmitting data and receive/measure signals from each eNB. Accordingly, during the designated active period, the UE 120 may utilize the received/measured signals from each eNB to determine whether or not to initiate and perform a handover to an eNB. The UE 120 may then receive/transmit the data.

Figure 6:
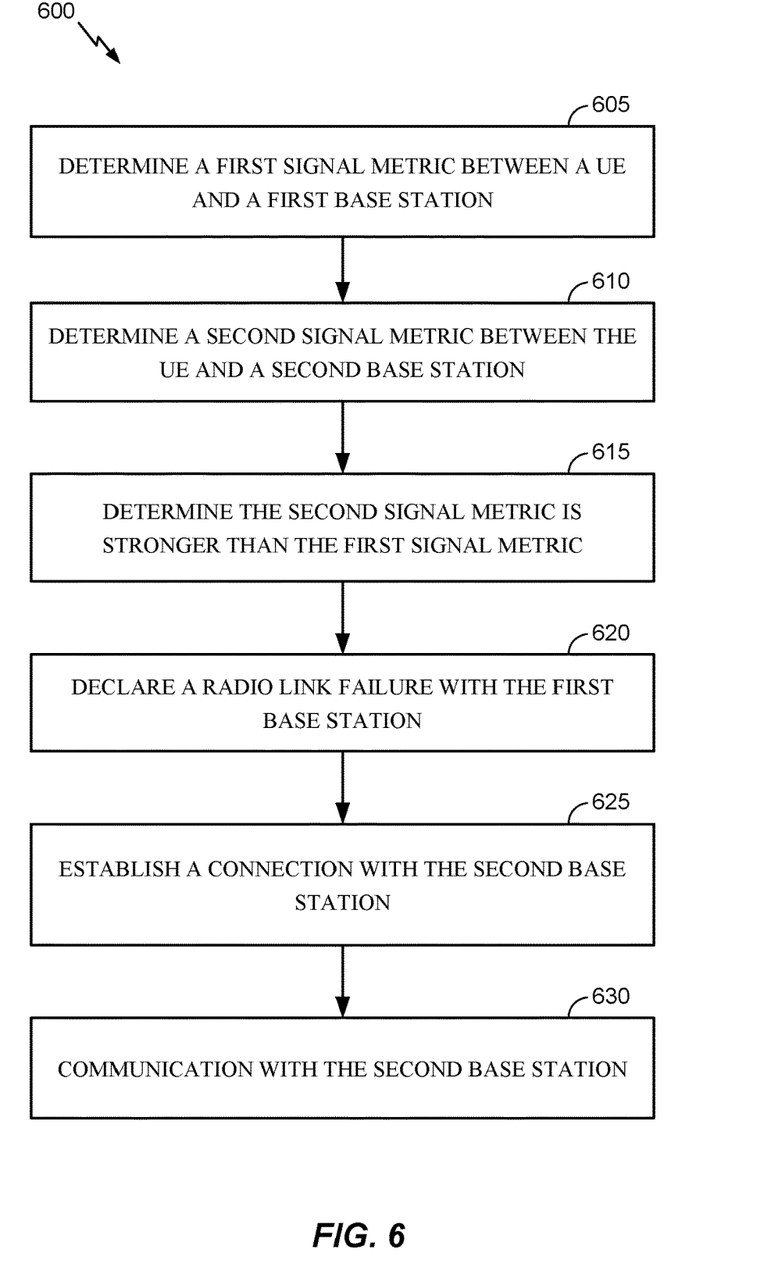
FIG. 6 is a flow diagram illustrating example operations for initiating and performing handover by a user equipment, in accordance with certain aspects of the present disclosure.

FIG. 6 is a flow diagram illustrating example operations for initiating and performing handover by a user equipment (e.g., UE 120), in accordance with certain aspects of the present disclosure.

At 605, the UE determines a first signal metric between the UE and a first base station, while the UE has a connection established with the first base station. For example, the first base station may comprise a serving base station of the UE, and the UE may be in a connected mode (e.g., RRC connected mode) with the first base station. Further, the UE may receive/measure a signal (e.g., reference signal) transmitted by the first base station, and calculate/determine the first signal metric based on the received/measured signal. In certain aspects, the UE may receive/measure the signal in response to having data to communicate (e.g., receive and/or transmit) on a communication network accessible via the first base station.

At 610, the UE determines a second signal metric between the UE and a second base station, while the UE does not have a connection established with the second base station. For example, the second base station may comprise a neighboring base station of the UE, and the UE may be in a connected mode (e.g., RRC connected mode) with the first base station. Further, the UE may receive/measure a signal (e.g., reference signal) transmitted by the second base station, and calculate/determine the second signal metric based on the received/measured signal. In certain aspects, the UE may receive/measure the signal in response to having data to communicate (e.g., receive and/or transmit) on a communication network accessible via either of the first base station and the second base station.

At 615, the UE determines that the second signal metric is stronger than the first signal metric. For example, the UE may determine that a difference between the second signal metric and the first signal metric satisfies a threshold. In particular, the difference satisfying the threshold may be indicative of the delay from performing a handover of the UE from the first base station to the second base station being less than the difference between the expected delay for communicating data between the first base station and the UE and the expected delay for communicating data between the second base station and the UE.

At 620, the UE declares a radio link failure with the first base station based on determining that the second signal metric is stronger than the first signal metric. For example, the UE may initiate a RLF procedure and transition from a connected mode with the first base station to an idle mode. In particular, the UE may declare an autonomous RLF with the first base station, even if it still has adequate channel conditions to communicate with the first base station.

At 625, the UE establishes a connection with the second base station. For example, the UE may perform a RRC connection reestablishment procedure with the second base station. Accordingly, the UE may be in a connected mode with the second base station.

At 630, the UE may communicate with the second base station. For example, the UE may transmit/receive the data with the second base station.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for performing, means for transmitting, means for receiving, means for sending, means for signaling, means for multicasting and/or means for broadcasting may include one or more processors, transmitters, receivers, and/or other elements of the user equipment 120 and/or the base station 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. One or more aforementioned devices or processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   determining a first signal metric between the UE and a first base station, while the UE has a connection established with the first base station;
   determining a second signal metric between the UE and a second base station, while the UE does not have a connection established with the second base station;
   determining that the second signal metric and the first signal metric indicate a stronger signal between the UE and the second base station than between the UE and the first base station;
   determining that a first delay for performing a handover of the UE from the first base station to the second base station is less than a second delay for performing one or more data transfers between the UE and the first base station as compared to performing the one or more data transfers between the UE and the second base station based on the first signal metric and the second signal metric;
   declaring a radio link failure with the first base station based on determining that the first delay is less than the second delay; and
   establishing a connection with the second base station.

2. The method of claim 1, wherein the first signal metric comprises at least one of a reference signal received quality, a reference signal received power, a signal-to-noise ratio, a channel quality indicator, a narrowband secondary synchronization channel signal reference power, a narrowband secondary synchronization channel signal to noise ratio, and a reference signal signal to interference plus noise ratio.

3. The method of claim 1, wherein the connection established with the first base station comprises a radio resource control connection.

4. The method of claim 1, wherein determining the second signal metric comprises measuring a signal from the second base station during a designated measurement gap period.

5. The method of claim 1, wherein determining the second signal metric comprises measuring a signal from the second base station during a sleep period prior to an active period of a connected mode discontinuous reception.

6. The method of claim 1, wherein determining the first signal metric and the second signal metric is performed based on the UE having a pending transmission.

7. The method of claim 1, wherein establishing the connection with the second base station comprises performing a radio resource control reestablishment procedure.

8. The method of claim 1, wherein determining that the second signal metric and the first signal metric indicate a stronger signal between the UE and the second base station than between the UE and the first base station comprises determining that the second signal metric is stronger than the first signal metric by at least a threshold value.

9. The method of claim 1, wherein determining that the second signal metric and the first signal metric indicate a stronger signal between the UE and the second base station than between the UE and the first base station comprises determining that the first signal metric is below a threshold.

10. The method of claim 1, wherein declaring a radio link failure with the first base station further comprises declaring a radio link failure with the first base station while channel conditions between the first base station and the UE are adequate to support communications.

11. A user equipment (UE) comprising:
    a memory; and
    a processor configured to:
      determine a first signal metric between the UE and a first base station, while the UE has a connection established with the first base station;
      determine a second signal metric between the UE and a second base station, while the UE does not have a connection established with the second base station;
      determine that the second signal metric and the first signal metric indicate a stronger signal between the UE and the second base station than between the UE and the first base station;
      determine that a first delay for performing a handover of the UE from the first base station to the second base station is less than a second delay for performing one or more data transfers between the UE and the first base station as compared to performing the one or more data transfers between the UE and the second base station based on the first signal metric and the second signal metric;
      declare a radio link failure with the first base station based on determining that the first delay is less than the second delay; and
      establish a connection with the second base station.

12. The user equipment of claim 11, wherein the first signal metric comprises at least one of a reference signal received quality, a reference signal received power, a signal-to-noise ratio, a channel quality indicator, a narrowband secondary synchronization channel signal reference power, a narrowband secondary synchronization channel signal to noise ratio, and a reference signal signal to interference plus noise ratio.

13. The user equipment of claim 11, wherein the connection established with the first base station comprises a radio resource control connection.

14. The user equipment of claim 11, wherein the processor being configured to determine the second signal metric comprises the processor being configured to measure a signal from the second base station during a designated measurement gap period.

15. The user equipment of claim 11, wherein the processor being configured to determine the second signal metric comprises the processor being configured to measure a signal from the second base station during a sleep period prior to an active period of a connected mode discontinuous reception.

16. The user equipment of claim 11, wherein the processor is configured to determine the first signal metric and the second signal metric based on the UE having a pending transmission.

17. The user equipment of claim 11, wherein the processor being configured to establish the connection with the second base station comprises the processor being configured to perform a radio resource control reestablishment procedure.

18. The user equipment of claim 11, wherein the processor being configured to determine that the second signal metric and the first signal metric indicate a stronger signal between the UE and the second base station than between the UE and the first base station comprises the processor being configured to determine that the second signal metric is stronger than the first signal metric by at least a threshold value.

19. The user equipment of claim 11, wherein the processor being configured to determine that the second signal metric and the first signal metric indicate a stronger signal between the UE and the second base station than between the UE and the first base station comprises the processor being configured to determine that the first signal metric is below a threshold.

20. The user equipment of claim 11, wherein the processor being configured to declare a radio link failure with the first base station further comprises the processor being configured to declare a radio link failure with the first base station while channel conditions between the first base station and the UE are adequate to support communications.

21. A user equipment (UE) comprising:
   means for determining a first signal metric between the UE and a first base station, while the UE has a connection established with the first base station;
   means for determining a second signal metric between the UE and a second base station, while the UE does not have a connection established with the second base station;
   means for determining that the second signal metric and the first signal metric indicate a stronger signal between the UE and the second base station than between the UE and the first base station;
   means for determining that a first delay for performing a handover of the UE from the first base station to the second base station is less than a second delay for performing one or more data transfers between the UE and the first base station as compared to performing the one or more data transfers between the UE and the second base station based on the first signal metric and the second signal metric;
   means for declaring a radio link failure with the first base station based on determining that the first delay is less than the second delay; and
   means for establishing a connection with the second base station.

22. The user equipment of claim 21, wherein the first signal metric comprises at least one of a reference signal received quality, a reference signal received power, a signal-to-noise ratio, a channel quality indicator, a narrowband secondary synchronization channel signal reference power, a narrowband secondary synchronization channel signal to noise ratio, and a reference signal signal to interference plus noise ratio.

23. The user equipment of claim 21, wherein the connection established with the first base station comprises a radio resource control connection.

24. The user equipment of claim 21, wherein means for determining the second signal metric comprises means for measuring a signal from the second base station during a designated measurement gap period.

25. The user equipment of claim 21, wherein means for determining the second signal metric comprises means for measuring a signal from the second base station during a sleep period prior to an active period of a connected mode discontinuous reception.

26. A non-transitory computer readable medium having instructions stored thereon for performing a method for wireless communications by a user equipment (UE), the method comprising:
   determining a first signal metric between the UE and a first base station, while the UE has a connection established with the first base station;
   determining a second signal metric between the UE and a second base station, while the UE does not have a connection established with the second base station;
   determining that the second signal metric and the first signal metric indicate a stronger signal between the UE and the second base station than between the UE and the first base station;
   determining that a first delay for performing a handover of the UE from the first base station to the second base station is less than a second delay for performing one or more data transfers between the UE and the first base station as compared to performing the one or more data transfers between the UE and the second base station based on the first signal metric and the second signal metric;
   declaring a radio link failure with the first base station based on determining that the first delay is less than the second delay; and
   establishing a connection with the second base station.

27. The non-transitory computer readable medium of claim 26, wherein the first signal metric comprises at least one of a reference signal received quality, a reference signal received power, a signal-to-noise ratio, a channel quality indicator, a narrowband secondary synchronization channel signal reference power, a narrowband secondary synchronization channel signal to noise ratio, and a reference signal signal to interference plus noise ratio.

28. The non-transitory computer readable medium of claim 26, wherein the connection established with the first base station comprises a radio resource control connection.

29. The non-transitory computer readable medium of claim 26, wherein determining the second signal metric comprises measuring a signal from the second base station during a designated measurement gap period.

30. The non-transitory computer readable medium of claim 26, wherein determining the second signal metric comprises measuring a signal from the second base station during a sleep period prior to an active period of a connected mode discontinuous reception.

31. The method of claim 1, wherein determining that the first delay is less than the second delay comprises:
   estimating a first number of repeated transmissions for performing the one or more data transfers between the UE and the first base station based on the first signal metric;

estimating a second number of repeated transmissions for performing the one or more data transfers between the UE and the second base station based on the second signal metric; and determining the second delay based on the first number of repeated transmissions and the second number of repeated transmissions.

32. The method of claim 1, wherein the one or more data transfers comprise a single data transfer.

33. The method of claim 1, wherein the one or more data transfers comprise a plurality of data transfers.

34. The method of claim 33, further comprising determining a number of data transfers included in the plurality of data transfers based on mobility information of the UE.

35. The method of claim 1, wherein determining that the first delay is less than the second delay comprises:
determining the second delay based on one or more capabilities of the first base station as compared to one or more capabilities of the second base station.

36. The method of claim 35, wherein the one or more capabilities comprise duplex mode support.

* * * * *